United States Patent [19]
Cushing

[11] Patent Number: 5,999,322
[45] Date of Patent: *Dec. 7, 1999

[54] MULTILAYER THIN FILM BANDPASS FILTER

[76] Inventor: David Henry Cushing, 7131 Quinnfield Way, Greely, Ontario, Canada, K4P 1B6

[ * ] Notice: This patent is subject to a terminal disclaimer.

[21] Appl. No.: 08/496,097

[22] Filed: Jun. 28, 1995

[51] Int. Cl.$^6$ .............................. G02B 5/28; G02B 5/10; G02B 5/22
[52] U.S. Cl. .................. 359/589; 359/587; 359/588; 359/885
[58] Field of Search ..................... 359/580, 584, 359/585, 586, 587, 588, 589, 885; 333/212

[56] References Cited

U.S. PATENT DOCUMENTS

| | | | |
|---|---|---|---|
| 4,756,602 | 7/1988 | Southwell et al. | 359/588 |
| 5,023,944 | 6/1991 | Bradley | 359/890 |
| 5,144,498 | 9/1992 | Vincent | 359/885 |
| 5,583,683 | 12/1996 | Scobey | 359/589 |
| 5,719,989 | 2/1998 | Cushing | 359/589 |

*Primary Examiner*—Cassandra Spyrou
*Assistant Examiner*—Audrey Chang
*Attorney, Agent, or Firm*—Neil Teitelbaum & Associates

[57] ABSTRACT

A novel design for producing bandpass filters with essentially square shapes with little or no ripple in the passband zone. Filters are of the all-dielectric type that consist of multiple cavities of bandpasses with the first and last cavities consisting of four less layers than the inner cavities. The inner cavities are all identical. All of the cavities are separated from each other by quarter wave thick layers of low index material. Layers of low index material may be added between the filter and the entrance and exit mediums. The thickness of the first few layers and last few layers may be altered to enhance the transmission of the filter by matching the index structure of the passband to the adjacent mediums.

4 Claims, 10 Drawing Sheets

| QWS #1 N/2 layers |
|---|
| HALF WAVE |
| QWS #2 N/2 layers +L+QWS #3 (N/2+2) layers |
| HALF WAVE |
| QWS #4 (N/2+2) layers +L+QWS #5 N/2 layers |
| HALF WAVE |
| QWS #6 (N/2) layers + L +QWS #7 (N/2) layers |
| HALF WAVE |
| QWS #m (N/2) layers + L +QWS #(m+1) (N/2) layers |
| HALF WAVE |
| QWS #(m+2) (N/2) layers + ... |

| SUBSTRATE |
|---|
| M layer    CAVITY #1 |
| QW LOW INDEX |
| M layer  CAVITY #2 |
| QW LOW INDEX |
| M layer  CAVITY #3 |
| QW LOW INDEX |
| M layer  CAVITY #4 |
| QW LOW INDEX |
| M layer    CAVITY #5 |
| EMERGENT MEDIUM |

Fig. 1a        Prior Art

| SUBSTRATE |
| --- |
| N-layer     CAVITY #1 |
| QW LOW INDEX |
| N+4 layer  CAVITY #2 |
| QW LOW INDEX |
| N+4 layer  CAVITY #3 |
| QW LOW INDEX |
| N+4 layer  CAVITY #4 |
| QW LOW INDEX |
| N-layer     CAVITY #5 |
| EMERGENT MEDIUM |

Fig. 1b

| HIGH INDEX QW |
|---|
| LOW INDEX QW |
| HIGH INDEX QW |
| HALF WAVE |
| HIGH INDEX QW |
| LOW INDEX QW |
| HIGH INDEX QW |

Fig. 4 Prior Art

| QWS #1 |
|---|
| HALF WAVE |
| QWS #2+L+QWS #3 |
| HALF WAVE |
| QWS #4+L+QWS #5 |
| HALF WAVE |
| QWS #6 |

Fig. 5a. Prior Art

| |
|---|
| QWS #1  N/2 layers |
| HALF WAVE |
| QWS #2 N/2  layers +L+QWS #3 (N/2+2) layers |
| HALF WAVE |
| QWS #4 (N/2+2) layers +L+QWS #5 N/2 layers |
| HALF WAVE |
| QWS #6 (N/2) layers + L +QWS #7 (N/2) layers |
| HALF WAVE |
| QWS  #m (N/2) layers + L +QWS #(m+1) (N/2) layers |
| HALF WAVE |
| QWS  #(m+2) (N/2) layers + ... |

Fig. 5b

MULTILAYER THIN FILM BANDPASS FILTER

FIELD OF THE INVENTION

This invention relates to dielectric bandpass filters, and more particularly to multi-layer multi-cavity structures that reduce transmission ripple in the passband.

BACKGROUND OF THE INVENTION

Optical interference, that modifies the transmitted and reflected intensities of light, occurs with the superposition of two or more beams of light. The principle of superposition states that the resultant amplitude is the sum of the amplitudes of the individual beams. The brilliant colors, for example, which may be seen when light is reflected from a soap bubble or from a thin layer of oil floating on water are produced by interference effects between two trains of light waves. The light waves are reflected at opposite surfaces of the thin film of soap solution or oil.

More importantly, a practical application for interference effects in thin films involves the production of coated optical surfaces. When a film of a transparent substance is deposited on transparent substrate such as glass, for example, with a refractive index which is properly specified relative to the refractive index of the glass and with a thickness which is one quarter of a particular wavelength of light in the film, the reflection of that wavelength of light from the glass surface can be almost completely suppressed. The light which would otherwise be reflected is not absorbed by a non-reflecting film; rather, the energy in the incident light is redistributed so that a decrease in reflection is accompanied by a concomitant increase in the intensity of the light which is transmitted.

Considerable improvements have been achieved in the anti-reflective performance of such films by using a composite film having two or more superimposed layers. Two different materials may be used in fabricating such a composite film, one with a relatively high index of refraction and the other with a relatively low index of refraction. The two materials are alternately deposited to predetermined thicknesses to obtain desired optical characteristics for the film. In theory, it is possible with this approach to design multi-layer interference coatings for a great variety of transmission and reflection spectrums. This has led to the development of many new optical devices making use of complex spectral filter structures. Anti-reflection coatings, laser dielectric mirrors, television camera edge filters, optical bandpass filters, and band rejection filters are some of the examples of useful devices employing thin film interference coatings.

One particular type of interference coating is the bandpass filter, which is designed to allow wavelengths within a predetermined range of the desired pass-band to be transmitted, while a range of wavelengths on either side of the pass band are highly reflected. Ideally a bandpass filters should be square in its response; thus, the transition from the rejection regions to the passband should be as rapid as possible, or expressed differently, the slope or transition region should be as steep as possible, while obtaining a pass band region that is uniform having little or no ripple.

Multi-cavity filters have been manufactured for more than 40 years. A usual approach of filter designers has been to simply anti-reflect equal length cavity structures to the substrate and the exit medium. However, this yields filters with excessive ripple in the passband. In an attempt to obviate this problem, the need to modify the cavity lengths was investigated thoroughly by experts in the thin film field. P. W. Baumeister in a paper entitled "Use of microwave prototype filters to design multilayer dielectric bandpass filters", published in Applied Optics Vol. 21, No. 16, Aug. 15, 1982, describes the use of a standing wave ratio technique to match reflective zones applying microwave filter synthesis. C. Jacobs in an article entitled "Dielectric square bandpass design", in Applied Optics, Vol. 20, No. 6 Mar. 15, 1981, describes the use of an effective index approach. A. Thelen in a book entitled Design of Optical Interference Coatings, McGraw-Hill Book Company 1989, describes equivalent layers and other schemes to reduce ripple. However, the layer sequences developed from these methods are not considered to be general and do not apply equally well for different ratios of index of refraction of the multi-layers.

Generally, procedures that result in high transmission reduce the bandwidth of this transmission at the expense of poor slopes (i.e. a slow rate of change) in the transition to blocking. Since the improvement in transmission outweighs the change in slope, additional cavities may be added to a filter to improve the slope.

In view of the limitations of the prior art, it is an object of this invention to provide a bandpass filter that overcomes many of these limitations.

Furthermore, it is an object of this invention to provide a bandpass filter in the form of a multi-layer, multi-cavity structure that reduces transmission ripple in the passband normally associated with other bandpass filters.

SUMMARY OF THE INVENTION

The present invention is comprised of a multilayer film of alternating layers of two (or more) transparent dielectric films with dissimilar indices of refraction. The invention utilizes anti-reflection from the filter structure to the substrate and output interfaces (if necessary) and also utilizes outer cavities with four layers less than the inner core structure on both sides of the core structure, to produce a low reflection profile in the passband. This structure is a very general approach to the design of high transmission filters. The squarest filters include an extra half wave (or more) in the center of these added cavities. The bandpasses for any of these designs will reduce the bandwidth of transmission compared to equal length cavity structures.

Advantageously, the filter as described in accordance with the invention has a much better slope than those of the aforementioned prior art. The desired results are produced with virtually any suitable materials that are transparent in the spectral area of interest.

In accordance with the invention, there is provided a bandpass filter comprising:

an array of cavities including two outer cavities and one or more other inner core cavities, each cavity having a plurality of quarter-wave reflecting stacks comprising layers of material of alternating high and low refractive index, said plurality of stacks beings separated by a half wave layer of dielectric material, each cavity being separated by quarter-wave layer of low refractive index material, wherein the number of layers in the at least one or more other cavities is an odd number greater or equal to 7, and wherein the first and last cavities in said array of cavities each have two less layers in each quarter-wave reflecting stack than in other quarter-wave reflecting stacks of the at least one or more other cavities in said array.

In accordance with the invention, there is further provided a bandpass filter comprising: an array of cavities including two outer cavities and at least one or more other cavities, each cavity having a plurality of quarter-wave reflecting stacks comprising layers of material of alternating high and low refractive index, the plurity of quater-wave reflecting stacks being separated by a half-wave layer of dielectric material, the plurality of stacks of said outer cavities being separated by a multiple half-wave layer of dielectric material for broadening the bandwidth of a passband of the filter and for reducing residual reflections, each cavity being separated by quarter-wave layer of low refractive index material, wherein the number of layers in the at least one or more other cavities is an odd number greater or equal to 7, and wherein the first and last cavities in said array of cavities each have two less layers in each quarter-wave reflecting stack than in other quarter-wave reflecting stacks of the at least one or more other cavities in said array.

In accordance with the invention there is further provided, a bandpass filter comprising:

an array of cavities including two outer cavities and at least one or more other cavities, each cavity having a plurality of quarter-wave reflecting stacks comprising layers of material of alternating high and low refractive index, the plurity of quater-wave reflecting stacks being separated by a multiple half-wave layer of dielectric material, and the plurality of stacks of said outer cavities being separated by a multiple half-wave layer of dielectric material for broadening the bandwidth of a passband of the filter and for reducing residual reflections, each cavity being separated by quarter-wave layer of low refractive index material, wherein the number of layers in the at least one or more other cavities is an odd number greater or equal to 7, and wherein the first and last cavities in said array of cavities each have two less layers in each quarter-wave reflecting stack than in other quarter-wave reflecting stacks of the at least one or more other cavities in said array.

BRIEF DESCRIPTION OF THE DRAWINGS

Exemplary embodiments of the invention will now be described in conjunction with the drawings, in which:

FIG. 1a is a cross sectional view of a prior art bandpass filter ensemble;

FIG. 1b is a cross sectional view of a bandpass filter ensemble in accordance with the invention;

FIG. 4 is a cross sectional view of a prior art dielectric filter cavity;

FIG. 5a is a cross sectional view of a prior art multi-cavity filter;

FIG. 5b is a cross sectional view of a multi-cavity filter in accordance with the invention;

GENERAL INFORMATION ABOUT FILTER CONSTRUCTION

Filters for wavelength division multiplexers and other communication industry applications require very straight slopes with low loss and virtually no ripple. Typical bandwidths range from 0.5 nm to 100 nm for the wavelength range 1250 to 1650 nm. There are many other applications for filters that would benefit from this improvement in technology that is provided by this invention.

Figure 2:
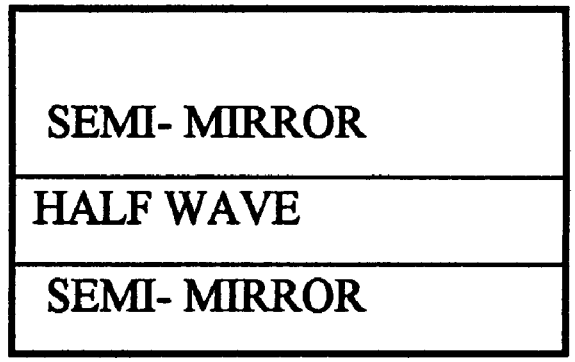
FIG. 2 is a cross sectional view of a solid etalon filter in accordance with the prior art.

The simplest filter, shown in prior art FIG. 2, consists of two partial-reflectors or semi-mirrors separated by a half wave layer of transparent dielectric material (similar to an Etalon).

Figure 3:
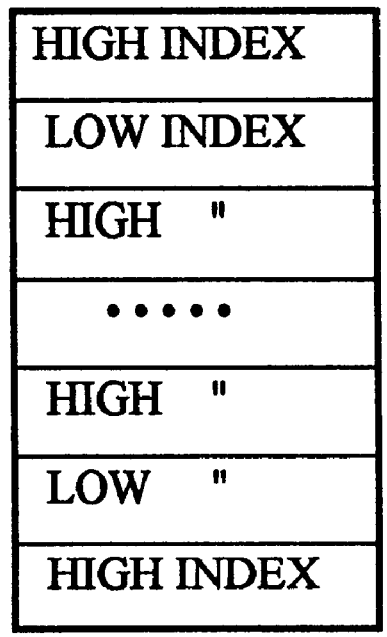
FIG. 3 a cross sectional view of a prior art quarter wave stack (QWS)

Turning now to FIG. 3, for all-dielectric filters, the partial-reflector shown consists of alternating layers of high and low index materials. The thickness of each layer is adjusted to be a quarter wave (QW) at the wavelength of the desired filter. Each partial-reflector (which may be comprised of only a single layer) is called a quarter-wave stack. The bandwidth of the filter is a function of the reflectance of quarter-wave stacks in the structure.

Referring now to FIG. 4, a filter cavity, one of the most ubiquitous and basic building blocks for all-dielectric interference filters, is shown. The cavity is comprised of two identical reflectors made from quarter-wave stacks separated by a half wave (or multiple halfwave) layer, as is seen in FIG. 4. Cavities are deposited on top of other cavities, with a quarter-wave layer of low index material between, to sharpen the slopes. This produces a multi-cavity filter shown in FIG. 5a.

Figure 6:
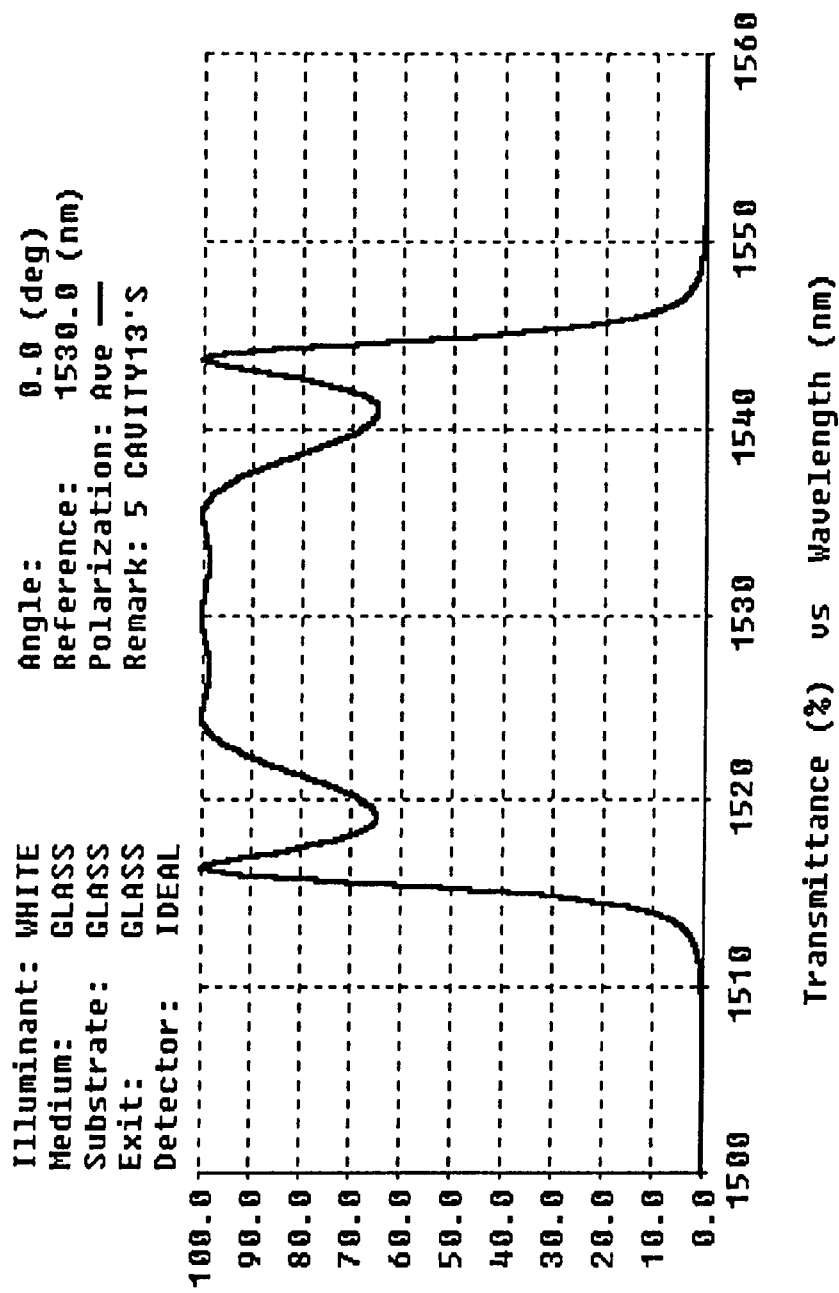
FIG. 6 is a graph of transmittance versus wavelength of a conventional five cavity filter each cavity with thirteen layers separated by low index quarter wave layers.

From a practical point of view, the total number of layers to be deposited controls the number of cavities possible. At 0.3 nm bandwidth and greater, multi-cavity designs are possible. Filters up to 10 nm bandwidth may be made easily with 3 or 4 cavities. For greater than 6 nm, even more cavities may be necessary to achieve the slopes for blocking the transmission of unwanted wavelengths of light. These filters have a large number of layers. Surface area yield is small and 25 mm diameter may be typical for the narrower bands. Equal length cavities produce the best roll-off with the broadest pass-zones, but examination of the graphs for equal cavity filters demonstrates that improvement is needed to reduce ripple in the passband to acceptable levels shown in FIG. 6.

DETAILED DESCRIPTION OF THE INVENTION

As shown in FIG. 1b, the filter ensemble of the invention includes: a transparent substrate 6, an optional matching layer above the substrate, if necessary (, not shown); an outer filter cavity 10*a* having N layers, where N≧3; a low refractive index layer; a series of filter core cavities 10*b* each having (N+4) layers, a layer 12 having a low refractive index between adjacent cavities 10*a*, 10*b*; another outer filter cavity 10*a* having of N layers; and, another matching layer if necessary (, not shown). In contrast, prior art FIG. 1*a*, shows a conventional filter having 5 cavities, each cavity having M layers including the outermost cavities.

Referring again to FIG. 1*b* of the invention, generally, the optional matching layer is a low refractive index material having a thickness of a quarter wave. However, material, thickness, and index of refraction of the matching layer(s) may be different from that of the low index material 12. The cavities 10*a* and 10*b* comprise alternating quarter wave thick layers of high and low index materials. The first material in a cavity 10*a* is high index and is followed by a low index material. For the simplest case the low index material is a multiple of half waves and is followed by a high index material i.e. HLLH; each layer indicating a quarter wave thick high or low index material. Thus, HLLH is considered to be a three layer structure, having a half wave layer LL of low refractive index material disposed between two layers HH, each a quarter wave thick of high refractive index material. Next, and between each cavity 10*a* and/or 10*b* that follows, the low index layer 12 is placed. The next core cavity 10*b* is of the layer structure HLH LL HLH in the simplest case. Hence, the core cavity 10*b* is considered to be a seven layer structure, having a half wave layer LL disposed between two HLH, quater wave layer. The core cavity 10*b* may be repeated many times to produce a filter having sharp slopes. The first cavity 10*a* is then repeated; and, finally another matching layer to the next medium is added as necessary.

The substrate 6 is transparent over the wavelength of interest. It may be made from a wide variety of materials including but not limited to glass, quartz, clear plastic, silicon, and germanium. The dielectric materials for this application have indices of refraction in the range 1.3 to greater than 4.0. The preferred materials are Magnesium Fluoride (1.38), Thorium Fluoride (1.47), Cryolith (1.35), Silicon Dioxide (1.46), Aluminum Oxide (1.63), Hafnium Oxide (1.85), Tantalum Pentoxide (2.05), Niobium Oxide (2.19), Zinc Sulphide (2.27), Titanium Oxide (2.37), Silicon (3.5), Germanium (4.0), and Lead Telluride (5.0). Other dielectric materials would serve as well.

After establishing the number of layers in each cavity, in accordance with the teaching of this invention, the design of the filter is easily accomplished with the aid of a commercially available computer program with optimization routines (for example, TFCalc™ by Software Spectra Inc.). Design recipes are entered into the program and a spectral response is calculated. When the design with the proper size cavities is selected to match the required nominal bandwidth, optimization of the filter transmission is performed for the matching layers. A designer selects from a choice of materials to use in a quarter wave match or may choose to use the same low index material with thickness adjustments to accomplish the matching.

The filter of FIG. 1*b* includes of an array of cavities, each separated by quarter waves of low index material. The number of layers in the core cavities 10*b* is an odd number and has to be more than five. The improvement in lessening ripple is quite pronounced for core cavities 10*b* with more than seven layers. In accordance with this invention, the first and last cavities 10*a* will have two less layers in each quarter wave stack for a total of four less layers in each cavity. The number of half waves in these outer cavities 10*a* should be the same as, or more than, those in the core stack(s) 10*b*. Theoretical plots will determine the optimum number of half waves for each situation.

Figure 7:
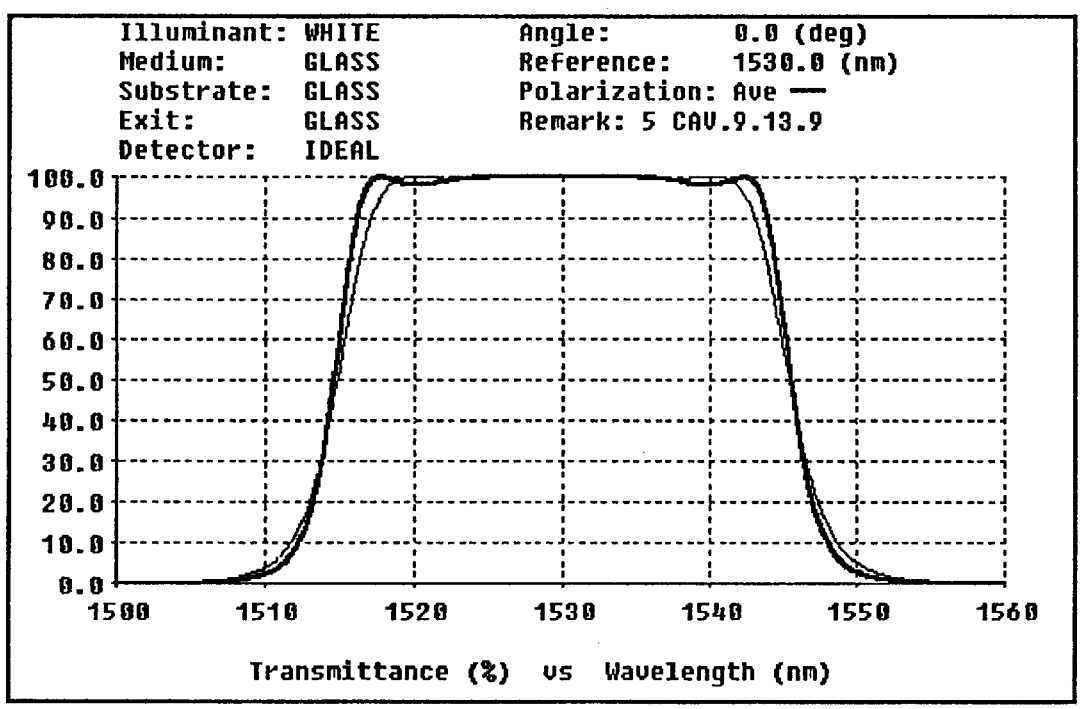
FIG. 7 is a graph of transmittance versus wavelength for a structure having a nine layer cavity, three thirteen layer cavities, and a second nine layer cavity in accordance with this invention.

FIG. 7 shows the transmission profile of a bandpass filter having three thirteen layer core stacks and nine layer outer stacks. The 9 layer outer stacks have either one or two half waves. The transmission profile for the two half waves or full wave stacks are indicated by the heavy line, and the transmission profile for the half wave stacks are shown by a lighter line. The substrate and medium are glass and each have an index of 1.51. The improvement in transmission results are clear.

Figure 8:
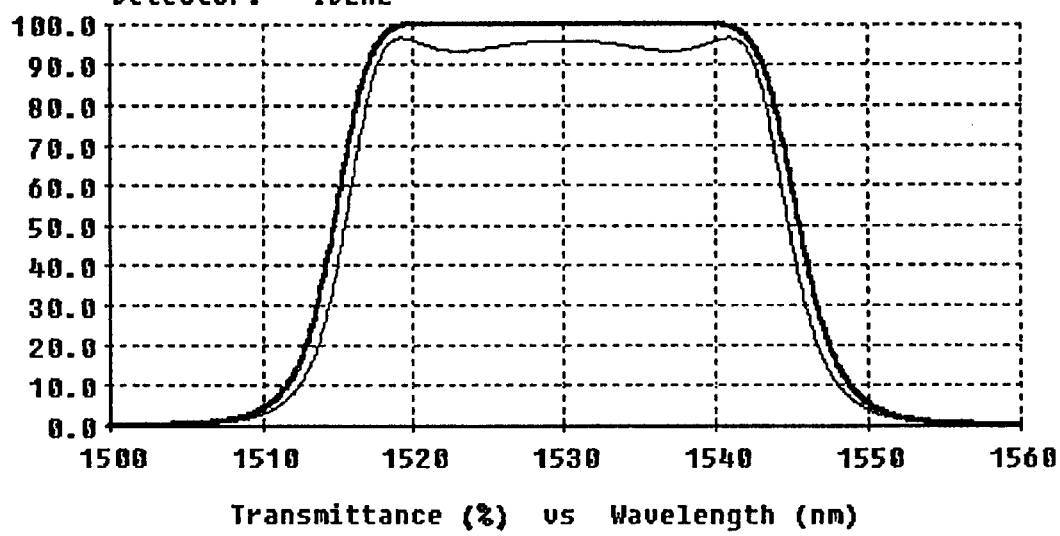
FIG. 8 is a graph of transmittance versus wavelength of a 63 layer Five Cavity Filter with emerging medium air; with (heavy line) and without (light line) anti-reflection matching with 0.7446 QW of ZnS for layer 62 and 0.5814 QW of ThF4 for layer 63.
Figure 10:
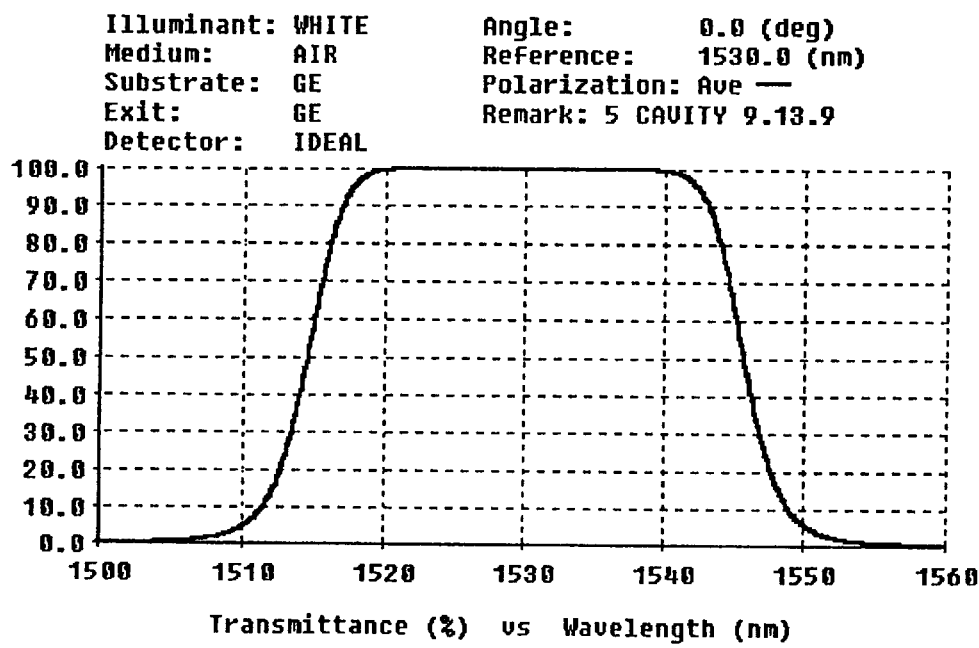
FIG. 10 is a graph of transmittance versus wavelength for a 62 layer Five Cavity Filter.

The index of refraction of the substrate and the emergent (or exit) medium will affect the ripple. To reduce ripple to a minimum, it may be necessary to match the filter structure to the emergent medium. For example, when the refractive index n of the emergent medium is between 1.44 and 1.8 a quarter wave layer of the low index material (for a low index material with an index of approximately 1.48 or less) will provide suitable matching. For indices of refraction greater than approximately 1.8 or less than approximately 1.44, layer changes are necessary between the medium and the filter. This problem is well known and has been addressed by those proficient in the art. FIG. 8 demonstrates the effect of matching the filter with the exit medium. A 63 layer Five Cavity Filter with emerging medium air; with (heavy line) and without (light line) anti-reflection matching with 0.7446 quarter wave of ZnS for layer 62 and 0.5814 quarter wave of ThF4 for layer 63. There is some ripple in the passband for the improved structure. Altering the thickness of the two layers adjacent to the exit medium to values determined by a computer optimization program removes the ripple completely as is evident from the solid line. FIG. 10 shows a 62 layer Five Cavity Filter with first ZnS layer removed and last ZnS layer 0.744 QW thick and added ThF4 layer 0.582 QW thick. The substrate is Germanium and the filter is matched to air; structure changes next to the substrate enhance the performance of the filter such that the index of the substrate is not an obstacle.

EXAMPLES

Figure 9:
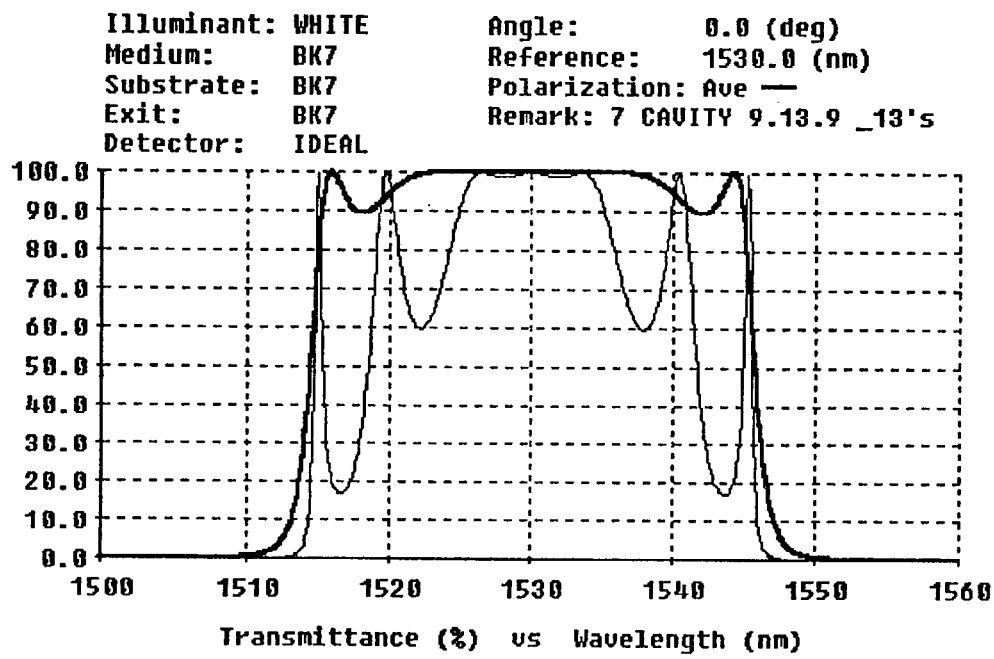
FIG. 9 is a graph of transmittance versus wavelength of a 97 layer 7 cavity conventional prior art (light line) filter vs. 91 layer modified cavity (heavy line )filter in accordance with the invention, having low index layers added between the filter and the mediums in the modified structure type.

Using Zinc Sulphide (with an index of 2.24 ) and Thorium Fluoride (with an index of 1.45) for the multi-layers, a seven cavity filter was calculated with and without ripple reducing end cavities (with extra low index layers added to ends). The ripple reduction is considerable as is seen in FIG. 9.

A five cavity filter was calculated with various substrates. FIG. 7 indicates the performance for immersion in glass with an index of 1.51. If the mediums have an index of refraction between 1.45 and 1.8 for 5 cavity filters, transmission is in excess of 98% from 1518 nm to 1542 nm with low index layers added to the beginning and the end of the filter recipe.

For the same five cavity structure changing the index of refraction of the substrate to 4.0 (Germanium) and the emergent medium to air (index of 1.0) the computer program was utilized to optimize the thickness of the first two and last two layers of the filter. FIG. 10 demonstrates that after anti-reflection, the filter properties are not appreciably altered from the results shown in FIG. 7.

Figure 11:
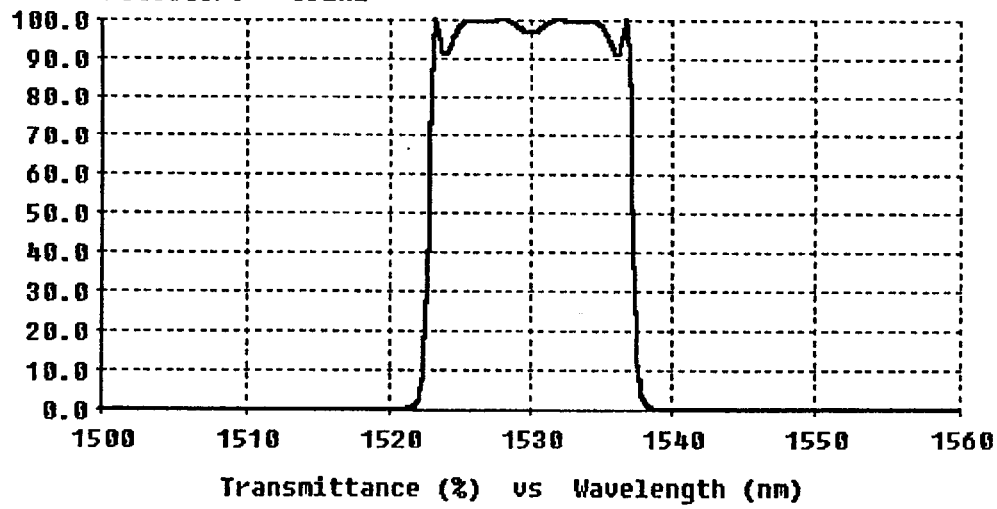
FIG. 11 is a graph of transmittance versus wavelength for a 105 layer bandpass filter with an eight cavity (modified); and, FIG. 12 is a graph of transmittance versus wavelength for an eight cavity filter.

The output response for an eight cavity filter constructed with Silicon for a high index (n=3.5) and Silicon Monoxide for a low index (n=1.85) consisting of 105 layers is shown in FIG. 11. Although there is some ripple in the passband, the transmission is much better than conventional cavity filters. Full waves are used to remove ripple.

Figure 12:
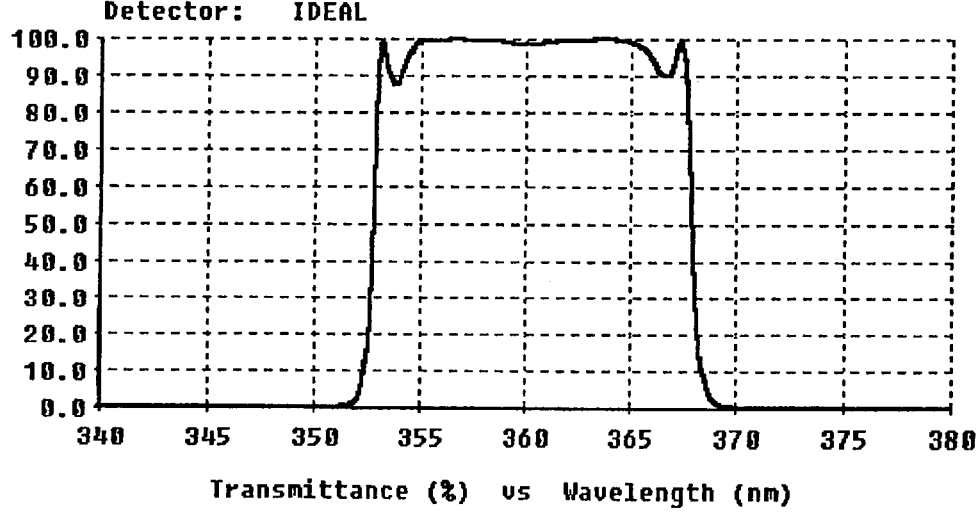

The output response for an eight cavity filter using Hafnium Oxide (n=1.9) and Quartz (n=1.46) with Magnesium Fluoride on the ends is illustrated in FIG. 12 wherein the materials are Hafnium Oxide (n=1.85) and Quartz (n=1.44), the filter having layers of Magnesium Fluoride (n=1.38) added between the filter and the medium. These and the next inner layers of HfO2 have their thickness adjusted to match the mediums. The first and last layers are Magnesium Fluoride. They, along with the next inner layers are matched to the mediums.

A comparison with FIG. 11 demonstrates that the basic band shape (output response) is practically independent of both the ratio of the indices of refraction and also the absolute values of each index of refraction. Comparisons of changing the high index with a constant low index show minor changes in the reflection value at the peak within the passband.

In summary, the filter in accordance with this invention provides substantial improvement in its output response over conventional filters. This is achieved by ensuring that the outer cavities have 4 less layers than the inner core cavities.

Of course numerous other embodiments and applications may be envisaged, without departing from the spirit and scope of the invention.

What I claim is:

1. A bandpass filter comprising:
    an array of cavities including two outer cavities and one or more inner core cavities, each cavity having a plurality of quarter-wave reflecting stacks comprising layers of material of alternating high and low refractive index, said plurality of stacks beings separated by a half wave layer of dielectric material, each cavity being separated by quarter-wave layer of low refractive index material, wherein the number of layers in the at least one or more inner core cavities is an odd number greater or equal to 7, and wherein the first and last cavities in said array of cavities each have two less layers in each quarter-wave reflecting stack than in other quarter-wave reflecting stacks of the at least one or more inner core cavities in said array.

2. A bandpass filter comprising:
    an array of cavities including two outer cavities and at least one or more other cavities,each cavity having a plurality of quarter-wave reflecting stacks comprising layers of material of alternating high and low refractive index, the pluarity of quarter-wave reflecting stacks being separated by a half-wave layer of dielectric material, the plurality of stacks of said outer cavities being separated by a multiple half-wave layer of dielectric material for broadening the bandwidth of a passband of the filter and for reducing residual reflections, each cavity being separated by quarter-wave layer of low refractive index material, wherein the number of layers in the at least one or more other cavities is an odd number greater or equal to 7, and wherein the two outer cavities in said array of cavities each have two less layers in each quarter-wave reflecting stack than in other quarter-wave reflecting stacks of the at least one or more cavities in said array.

3. A bandpass filter comprising:
    an array of cavities including two outer cavities and at least one or more other cavities, each cavity having a plurality of quarter-wave reflecting stacks comprising layers of material of alternating high and low refractive index, the pluarity of quarter-wave reflecting stacks being separated by a multiple half-wave layer of dielectric material, and the plurality of stacks of said outer cavities being separated by a multiple half-wave layer of dielectric material for broadening the bandwith of a passband of the filter and for reducing residual reflections, each cavity being separated by quarter-wave layer of low refractive index material, wherein the number of layers in the at least one or more other cavities is an odd number greater or equal to 7, and wherein the first and last cavities in said array of cavities each have two less layers in each quarter-wave reflecting stack than in other quarter-wave reflecting stacks of the at least one or more other cavities in said array.

4. A bandpass filter as defined in claim 3, wherein the multiple half-wave layer of dielectric material of the at least one or more other cavities comprises fewer multiple half-waves than the multiple half-wave layer of the two outer cavities.

* * * * *